(12) United States Patent
Larroy

(10) Patent No.: US 9,874,451 B2
(45) Date of Patent: Jan. 23, 2018

(54) FRESH HYBRID ROUTING INDEPENDENT OF MAP VERSION AND PROVIDER

(71) Applicant: HERE Global B.V., Veldhoven (NL)

(72) Inventor: Pedro Larroy, Berlin (DE)

(73) Assignee: HERE Global B.V., Eindhoven (NL)

( * ) Notice: Subject to any disclaimer, the term of this patent is extended or adjusted under 35 U.S.C. 154(b) by 20 days.

(21) Appl. No.: 14/692,216

(22) Filed: Apr. 21, 2015

(65) Prior Publication Data
US 2016/0313132 A1    Oct. 27, 2016

(51) Int. Cl.
*G01C 21/34* (2006.01)
*B60W 30/14* (2006.01)
*G01C 21/32* (2006.01)

(52) U.S. Cl.
CPC .......... *G01C 21/34* (2013.01); *B60W 30/14* (2013.01); *G01C 21/32* (2013.01)

(58) Field of Classification Search
CPC ...... G01C 21/00; G01C 21/005; G01C 21/26; G01C 21/28; G01C 21/30; G01C 21/32; G01C 21/34; G01C 21/3407; G01C 21/36; G01C 21/3605; B60W 30/14; B62D 15/02

See application file for complete search history.

(56) References Cited

U.S. PATENT DOCUMENTS

| | | | | |
|---|---|---|---|---|
| 6,526,284 | B1 * | 2/2003 | Sharp ..................... | G01C 21/26 340/995.1 |
| 8,014,945 | B2 * | 9/2011 | Cooper ................. | G01C 21/26 701/452 |
| 8,799,246 | B2 | 8/2014 | Nomura et al. | |
| 8,949,016 | B1 * | 2/2015 | Ferguson .............. | B60W 30/00 340/436 |
| 2001/0034588 | A1 * | 10/2001 | Agrawals ............... | G01C 21/36 703/2 |

(Continued)

FOREIGN PATENT DOCUMENTS

| | | |
|---|---|---|
| WO | WO2010056942 | 5/2010 |
| WO | WO2011068698 | 6/2011 |

(Continued)

OTHER PUBLICATIONS

Samar et al., Independent Zone Routing: An Adaptive Hybrid Routing Framework for Ad Hoc Wireless Networks, Aug. 2004, people.ece.cornell.edu/haas/Publications/ToN-samar-pearlman-haas-2004-08.pdf.

(Continued)

*Primary Examiner* — Nicholas Kiswanto
(74) *Attorney, Agent, or Firm* — Lempia Summerfield Katz LLC

(57) ABSTRACT

Systems, methods, and apparatuses are described for providing fresh hybrid routing independent of map version and provider. A set of routing data is received in response to a routing request. The set of routing data includes road segments. An analysis may be performed of a local map and the set of routing data. At least one unmatched road segment between the local map and the set of routing data is identified based on the analysis. A request for update data for the at least one unmatched road segment is made. Using the local map, the set of routing data, and the update data for the at least one unmatched road segment a navigation action is generated.

19 Claims, 10 Drawing Sheets

(56) References Cited

U.S. PATENT DOCUMENTS

| | | | |
|---|---|---|---|
| 2004/0135705 A1* | 7/2004 | Umezu | G01C 21/32 |
| | | | 340/995.14 |
| 2004/0220957 A1* | 11/2004 | McDonough | G01C 21/32 |
| 2007/0005609 A1* | 1/2007 | Breed | B60N 2/2863 |
| 2009/0150457 A1* | 6/2009 | Nakamura | G01C 21/32 |
| 2009/0299626 A1* | 12/2009 | Denaro | G01C 21/26 |
| | | | 701/533 |
| 2013/0326407 A1* | 12/2013 | van Os | G01C 21/00 |
| | | | 715/810 |
| 2016/0063032 A1* | 3/2016 | Kishore | G06F 17/30241 |
| | | | 701/409 |

FOREIGN PATENT DOCUMENTS

| | | |
|---|---|---|
| WO | WO2013153063 | 10/2013 |
| WO | WO2014060230 | 4/2014 |
| WO | WO2014179297 | 11/2014 |

OTHER PUBLICATIONS

White Paper, 2009-2012, Version: 1.5, revision 2, TomTom.

\* cited by examiner

| Segment | Segment Version |
|---------|-----------------|
| S1      | V1              |
| S2      | V1              |
| S3      | V2              |

202

| Segment | Segment Version |
|---------|-----------------|
| S1      | V1              |
| S2      | V1              |
| S3      | V2              |
| S4      | V1              |

| Segment | Segment Version | Segment Data |
|---|---|---|
| S1 | V1 | D1 |
| S2 | V1 | D1 |
| S3 | V2 | D1 |

304:

| Segment | Segment Version | Segment Data |
|---|---|---|
| S1 | V1 | D1 |
| S2 | V2 | D2 |
| S3 | V2 | D1 |

FIG. 6A
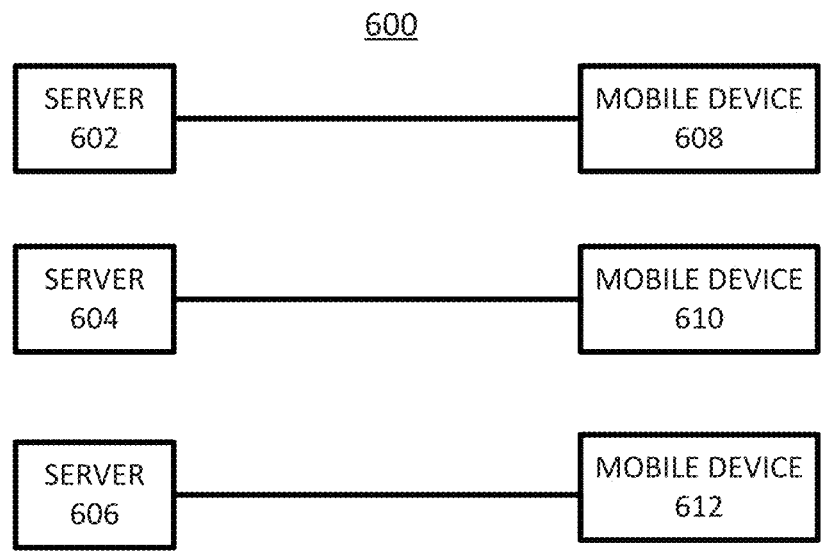
FIG. 6B
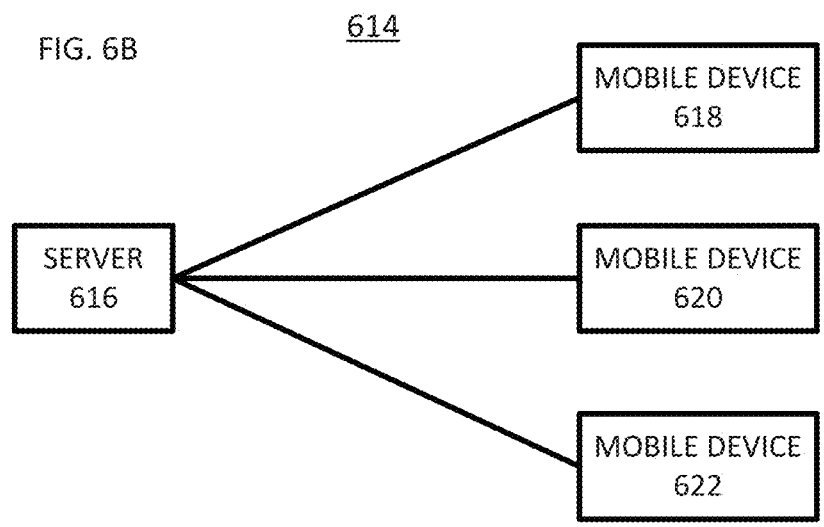
FIG. 6

FRESH HYBRID ROUTING INDEPENDENT OF MAP VERSION AND PROVIDER

FIELD

The following disclosure relates to methods, systems, and apparatuses for providing a fresh hybrid routing independent of map version and provider.

BACKGROUND

Incremental map updating, hybrid routing, and navigation data streaming are critical to modern navigation systems. The term hybrid routing refers to a system in which some map data is cached at the mobile device, but the mobile device still relies on downloading map data from a server as the mobile device travels to new geographic areas. The area of highly automated driving (HAD) applications require reliable data. Reliability in this context has two aspects. First, the data must be fresh, i.e. up to date and current. Fresh data ensures that the data used to construct hybrid routes, or any routes, is current. Second, the data must be consistent. For a database to be consistent the data contained in the database must be compatible with the other data in the database. This compatibility makes the data consistent, or dependable, and when the data is accessed it produces expected results.

SUMMARY

Methods, apparatuses, and systems are provided which receive routing requests and determine unmatched road segments between data sets to provide update data to a client to generate a navigation command. A set of routing data corresponds to the routing request. The routing data includes road segments. An analysis is performed on a local map, and the set of routing data. A number of unmatched road segments between the local map and set of routing data are identified based on the analysis. Based on these unmatched road segments update data is requested and one or more routes based on the routing request are generated. The route may be sent to an end user, a server, or some other system. The route that is generated may be generated from a set of routing data that may be accessed from any type of map provider, including a set of routing data generated from a different provider or data version than the one in the client.

In one embodiment, the navigation application may receive a routing request for routing data. The routing data corresponds to a set of road segments in a navigational map. The navigation application may perform an analysis of a local map, and the set of routing data. The local map and the set of routing data may include road segment data. The navigation application may identify a number of unmatched road segments between the local map and the set of routing data based on the analysis. The unmatched road segments indicates that road segments in the local map and set of routing data are not consistent with each other. The navigation application may request update data for the unmatched road segments. The navigation application may generate a navigation command based on the routing request, local map, set of routing data, and the update data for the unmatched road segments.

In another embodiment, a non-transitory computer readable medium is operable to execute instructions for providing fresh hybrid routing independent of map version and provider. The instructions when executed receive a set of routing data, perform an analysis of a local map and the set of routing data, identify at least one unmatched route segment between the local map and the set of routing data based on the analysis, and generate a route based on the local map, the set of routing data, and the update data for the at least one unmatched route segment.

BRIEF DESCRIPTION OF THE DRAWINGS

Exemplary embodiments are described herein with reference to the following drawings.

FIG. 2 illustrates an example for storing segment data in a local database and a server database.

FIG. 3 illustrates another example for storing segment data in a local database and a server database.

FIGS. 6a and 6b illustrate example server arrangements for providing fresh hybrid routing independent of map version and provider.

DETAILED DESCRIPTION

Figure 1:
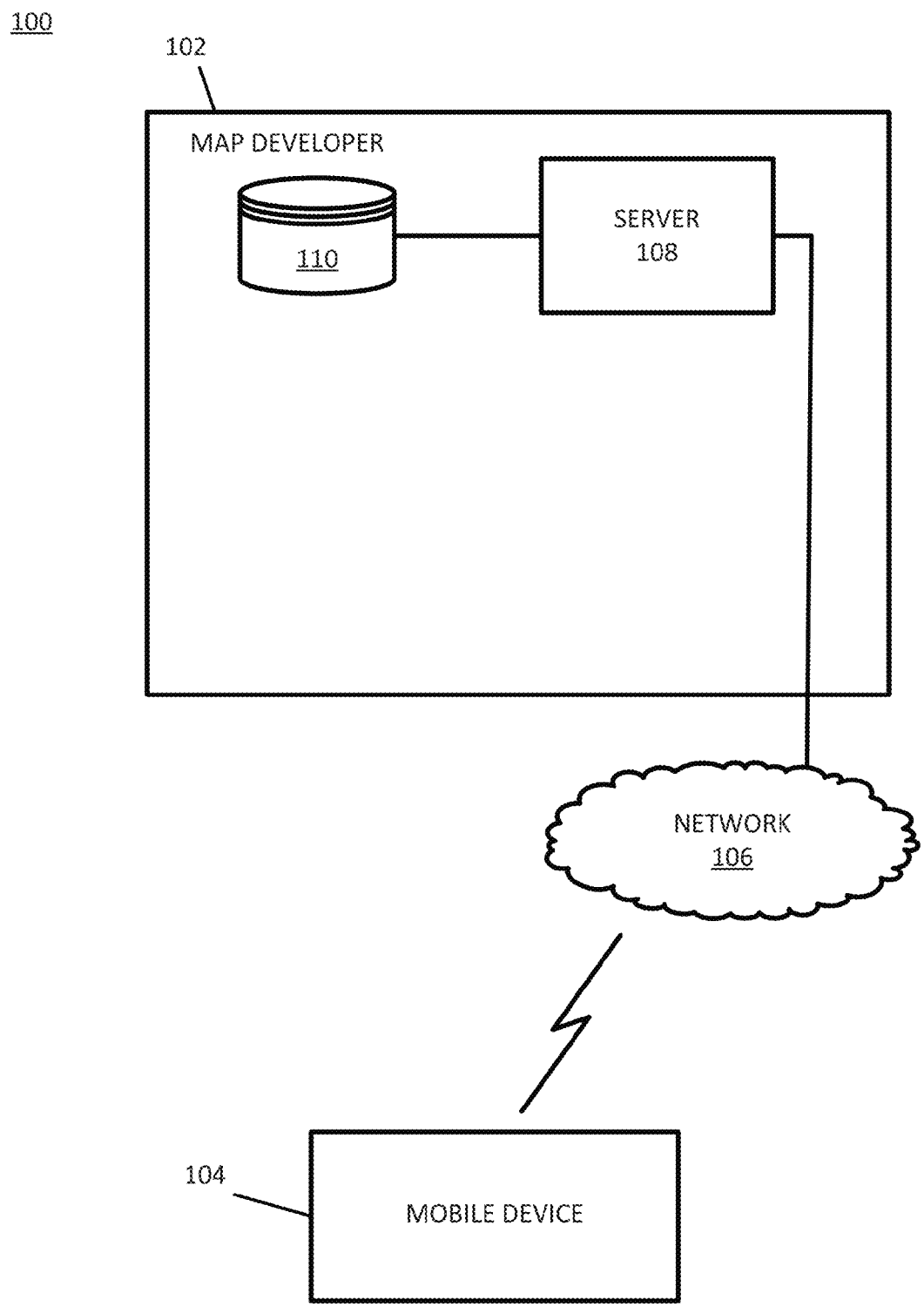
FIG. 1 illustrates an example system for fresh hybrid routing independent of map version and provider.

Modern navigation systems use versioning to address freshness and consistency. Often navigation content is stored in tiles. The tiles have a version and are often stored in a database (such as a SQLite database) as binary large objects (BLOBs). Additionally, the tiles may be composed of road segments. The road segments may have a version and data associated with them.

Road network information may include tile data and segment data. To construct a route from the road network information, routing graph data and related road network information may be used in order to match routes from the server. The matched data may be data common to map makers independent of the map provider while being able to offer the freshest most-up-to-date routes to a client. For example, map providers commonly use road geometry as a data attribute for road segments. If an update to the client is not possible, the system may degrade to a best-effort matching protocol depending on the client capabilities. The best-effort matching protocol may mean a set of instructions to construct a route using whatever data is stored in the local map. The best-effort matching protocol may produce a route that corresponds to actual road segment attributes as they exist in the real world at the moment of construction, or the best-effort matching protocol may construct a route that does not correspond to actual road segment attributes as they exist in the real world at the moment of construction.

Additionally, full offline routing capabilities based on the client capabilities are possible. A server may calculate the required routing graphs for different transportation types such as car, truck, and bicycle. Each transportation type may have particular restrictions unique to the transportation type. For example, a truck may only be able to route along road segments that meet certain height requirements. Similarly, a bicycle would only be able to route along road segments that have a bike lane. The server may publish the required routing graphs, or routing requirements into a metastore or public restful application programming interface (API) for access by users and developers.

A metastore may be a set of information about the information stored in a routing database, or a map database, such as ids of road segments, ids of previously created routes, a set of rules for building routes, or other meta information about routing. A restful API is an interface which defines the operations of a program in terms of hypertext transfer protocol (HTTP) operations such as GET, PUT, POST, and DELETE. The API uses the HTTP operations to manipulate and manage the data in the API.

For instance, a client may use a three layered approach of functionality for providing fresh hybrid routing independent of map version and provider. First, a route matching module may be used which allows to match piecewise elements of a route response returned from a routing server. A module may be a set of functions that perform various routing and navigation tasks. The module may be interchangeable with other navigation elements and include functions that manipulate navigation data in an industry standard manner. Piecewise elements may be road segments stored in a local map or as part of navigational map data stored on a server. The route matching module may have the following sub modules: a matching module which locates nontrivial segments to the local data in a version independent/vendor independent way; and a shortest-path module which is able to connect the gaps between the matched parts for degradation. The shortest-path module may guarantee a match without extensive processing usage on the client.

Nontrivial segments may mean road segments that are connected to other road segments. For example, a road segment which has a four-way intersection as part of the road segment would be nontrivial. Conversely, a trivial segment may be a road segment on a highway that does not have any on-ramps or off-ramps for ingress and egress.

Version independent may mean that routes are constructed regardless of the version indicator that is associated with a road segment. Similarly, vendor independent may mean that there are particular segment attributes that are standardized across map providers for use in all road segments, and as such, routes may be constructed in a vendor independent manner by collecting data for a route using multiple vendors.

The client may also have a module to request detailed geometry and attributes for unmatched parts of the route in order for the client to be able to route with the freshest routes from the server and display correctly in the client. In one example, this means getting tile data for the unmatched parts of the route that needs updating. Fresh data may also mean the data that is most current for that particular road segment. Most current may mean segment data that was recently collected in the real world for the segment, or collected via satellite data, or some other type of road data collection. The fresh data is in contrast to data that may not have been updated in some time and therefore may not represent the reality of the road characteristics as they exist at that moment in time.

Lastly, the client may use a small data abstraction layer which manages overlapping tiles at the junctions that delimit the unmatched area and regain connectivity to the matched part. When update data is received the data abstraction layer may handle updating the tiles with the update data The following embodiments relate to a method for providing fresh hybrid routing independent of map version and provider. Updating navigational map data historically is achieved by maintaining a network (e.g., internet) connection between a navigation application and a server. The navigation application may download parts of a map at regular intervals. However, downloading the entire map may take significant time and bandwidth. Missing segment data, or other map data, may be identified to address the problem of updating navigational map data when there is no internet connection between a navigation application and a server which stores map data.

FIG. 1. illustrates an example system 100 for providing fresh hybrid routing independent of map version and provider. FIG. 1. includes a device 102 (which may be a map developer), a mobile device 104, a network 106, a server 108, and a database 110. Additional, different, or fewer components may be provided. For example, many mobile devices 104 connect with the network 106. The device 102 may include one or more servers 108 and one or more databases 110. In one embodiment the mobile device 104, may receive a set of routing data in response to a routing request. The routing request may come from an end user of the mobile device 104. In other embodiments the server 108 may receive the set of routing data. The set of routing data may include road segments. The set of routing data may also include segment attributes, geographic coordinates, and connectivity information. Connectivity information may refer to the attributes of segments related to the segments connection to other segments in the routing data. For example, a segment may represent a highway section in the routing data and have an off-ramp that connects to a frontage road that runs along the highway. This type of information would be indicated as connectivity information in a segment attribute.

The mobile device 104 may perform an analysis of a local map and the set of routing data. The local map may be stored on the mobile device 104. In other embodiments the server 108 performs the analysis of the local map stored on either the mobile device or at the database 110. The analysis may produce a complete match, a partial match, or a failure. A complete match may be the result where all road segments in the local map and the set of routing data are the same version, include the same data, or a set of attributes that are matched, or some combination thereof. A partial match may be a result where some of the road segment data on the local map matches some of the road segment data in the set of routing data.

The mobile device 104, or server 108, may identify at least one unmatched road segment between the local map and the set of routing data. The at least one unmatched road segment may be determined by comparing the local map and the set of routing data. The mobile device 104 may generate a list of matched road segments and a list of unmatched road segments. The list of matched road segments may be discarded and the list of unmatched road segments may be saved. The at least one unmatched road segment may have a different version from the road segments stored on the local map or have different data than what is stored on the local map.

The mobile device 104, or the server 108, may request update data for the at least one unmatched road segment. The update data may correspond to the discrepancy between the local map and the set of routing data. Requesting the update data may include a request for geometry and segment attributes for the at least one unmatched road segment. The update data may be stored at the mobile device 104, the server 108, or in the database 110. In some embodiments the update data may be stored by a third-party vendor accessible by the mobile device 104, or server 108, through the network 106.

The mobile device 104, or the server 108, may generate a navigation command based on the local map, the set of routing data, and the update data for the at least one unmatched road segments. In the event that the analysis produced a failure and no update data exists, the mobile device 104, or server 108, may generate the navigation command using the local map and the set of routing data. The navigation command may be a route, a driving command, or a driving assistance command. The driving command may be turning a vehicle, accelerating a vehicle, braking a vehicle, or some combination thereof. The driving assistance command may be adaptive cruise control, lane correction, traffic sign identification, or some combination thereof. The navigation command may be a combination of a route, a driving command, a driving assistance command, or some combination thereof. In some embodiments, generating a navigation command may also include updating the local map for the at least one unmatched road segment to include the update data. The navigation commands may be presented as options to a user of the mobile device 104.

In one embodiment, the mobile device 104 communicates with an assisted driving device or acts as the assisted driving device. The assisted driving device may operate an autonomous vehicle, a highly assisted vehicle, or an advanced driving assistance system. The mobile device 104 may generate a driving command message or receive the driving command message from an external device such as the server 108. The driving command may be a microspeed tuning command to incrementally adjust speed up or down based on the network state.

The term autonomous vehicle may refer to a self-driving or driverless mode in which no passengers are required to be on board to operate the vehicle. An autonomous vehicle may also be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The driving command may instruct the autonomous vehicle to increase speed (accelerate), decrease speed (decelerate or brake), or follow a route based on the network state of the cellular network.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The HAD vehicle may be controlled to increase or decrease speeds based on the driving command based on network state.

An Advanced Driver Assisted System (ADAS) vehicle includes one or more partially automated systems in which the vehicle alerts the driver. The driving command may instruct the ADAS vehicle to present a message to the user to suggest acceleration, braking, or making a turn based on the network state of the cellular network. Features may include adaptive cruise control, automate braking, or steering adjustments.

FIG. 2 illustrates an example set of databases 200, which may be used to store segment data. In FIG. 2 database 202 may correspond to a database that is stored locally on a mobile device, such as the mobile device 104 of FIG. 1, or stored locally on a server, such as the server 108 of FIG. 1. The local database may be a representation of a local map. The database may include a segment identifier, such as S1 in the first row under the column labeled "Segment," and a segment version, such as V1 in the first row under column labeled "Segment Version." The database 204 may be stored on another device away from the mobile device, or server. The database 204 may be a set of routing data sent to the mobile device or server.

In one example the database 202 is stored on the mobile device 104 of FIG. 1, and the database 204 is stored on the server 108 of FIG. 1. In the example depicted in FIG. 2, the local database does not have the additional segment, "S4" that is included in the set of routing data in database 204. The local database may need segment "S4" to generate a route or navigation command for the routing request. When the system identifies at least one unmatched road segment, the system may generate a list of matched and unmatched road segments. In this example, the list of unmatched road segments would include segment "S4" stored in the database 204. The system may request update data for "S4." The generated navigation command may be generated from the update data for segment "S4," the local database 202, and the set of routing data.

FIG. 3 illustrates another example set of databases 300, which may be used to store segment data. In this example, the database 302 may be a database stored locally on a mobile device or server. The database 304 may be a database stored elsewhere from the database 302, and may represent a set of routing data. The segment data on the second line of database 304 may be different than the segment data on second line for the database 302. When the system requests update data for the unmatched segment (which in this case would be segment "S2" because of the difference in segment version and segment data) the update data would correspond to segment "S2" as stored in database 304. In other embodiments, the update data may include new versions of segments stored in the set of routing data, or some combination of new versions, new data, or missing segments.

Figure 4:
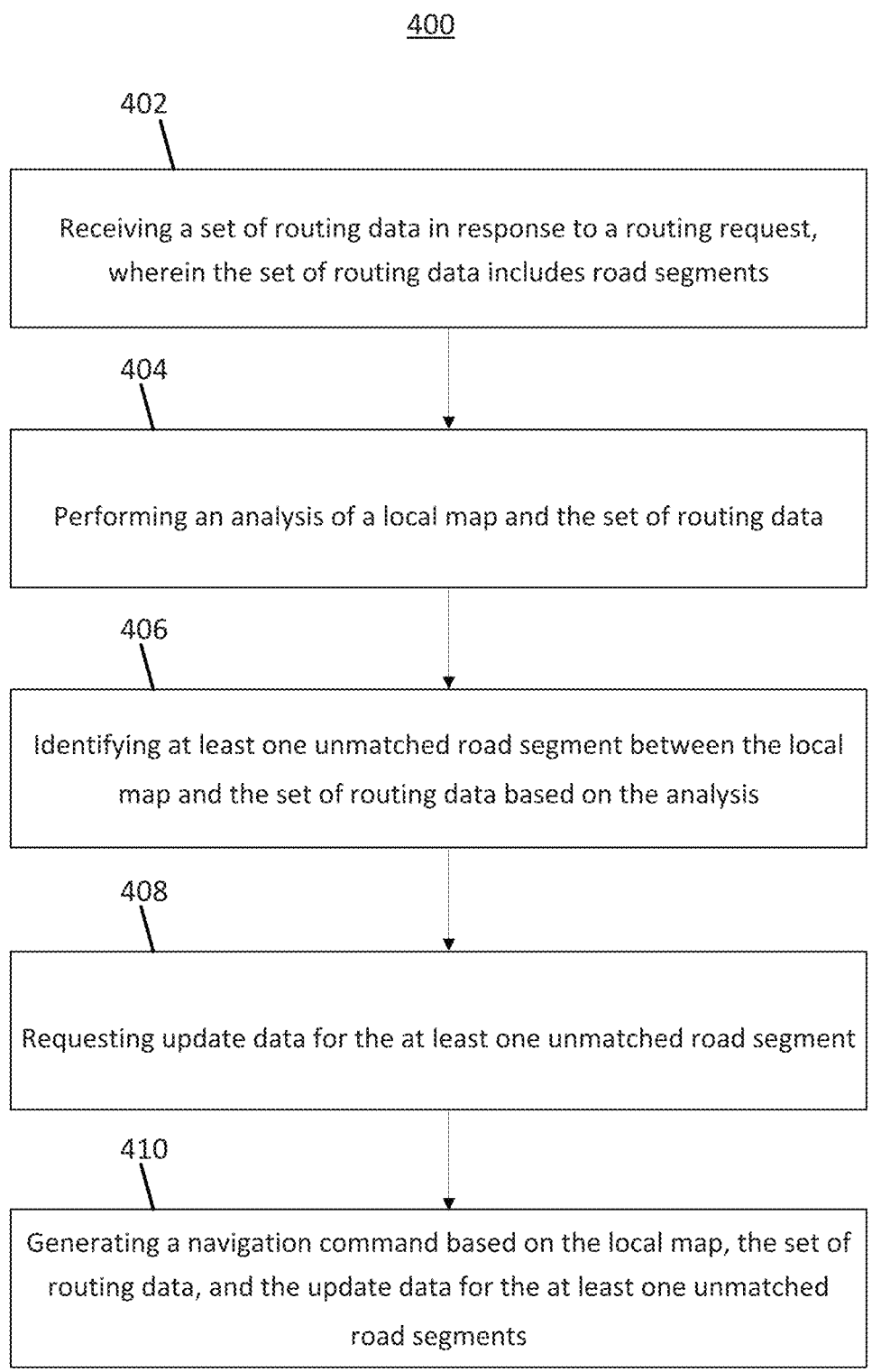
FIG. 4 illustrates an example flowchart for operation of a system for fresh hybrid routing independent of map version and provider.

FIG. 4 illustrates an example method 400 for providing fresh hybrid routing independent of map version and provider. Additional, different, or fewer acts may be provided. In one embodiment, the system of FIG. 1. may use the method of FIG. 4. For example, the mobile device 104 may receive a set of routing data at act 402. The routing data may correspond to a starting destination and an end destination. The mobile device may perform an analysis of the local map and the set of routing data at act 404. The analysis may check the local map on the mobile device to see if the local map has segments to complete the route, and then the analysis may check the local map against the routing data to see if the segments identified match the segments in the routing data.

At act 406, the mobile device may identify at least one unmatched road segment between the local map and the set of routing data. The unmatched segments may represent segments that are present in the set of routing data, but not present in the local map. Additionally, the unmatched segments may represent a version of segment data that is present in the set of routing data, but a different version of the same segment is present in the local map. The mobile device may request update data for the at least one unmatched road segment at act 408. The update data may be used to make changes to the local map segment data with the segment data from the set of routing data. The mobile device may generate a navigation command based on the local map, set of routing data, and update data at act 410. In other embodiments, the mobile device and server 108 may perform one or more of the acts. The mobile device and server 108 may communicate through the network 106.

Figure 5:
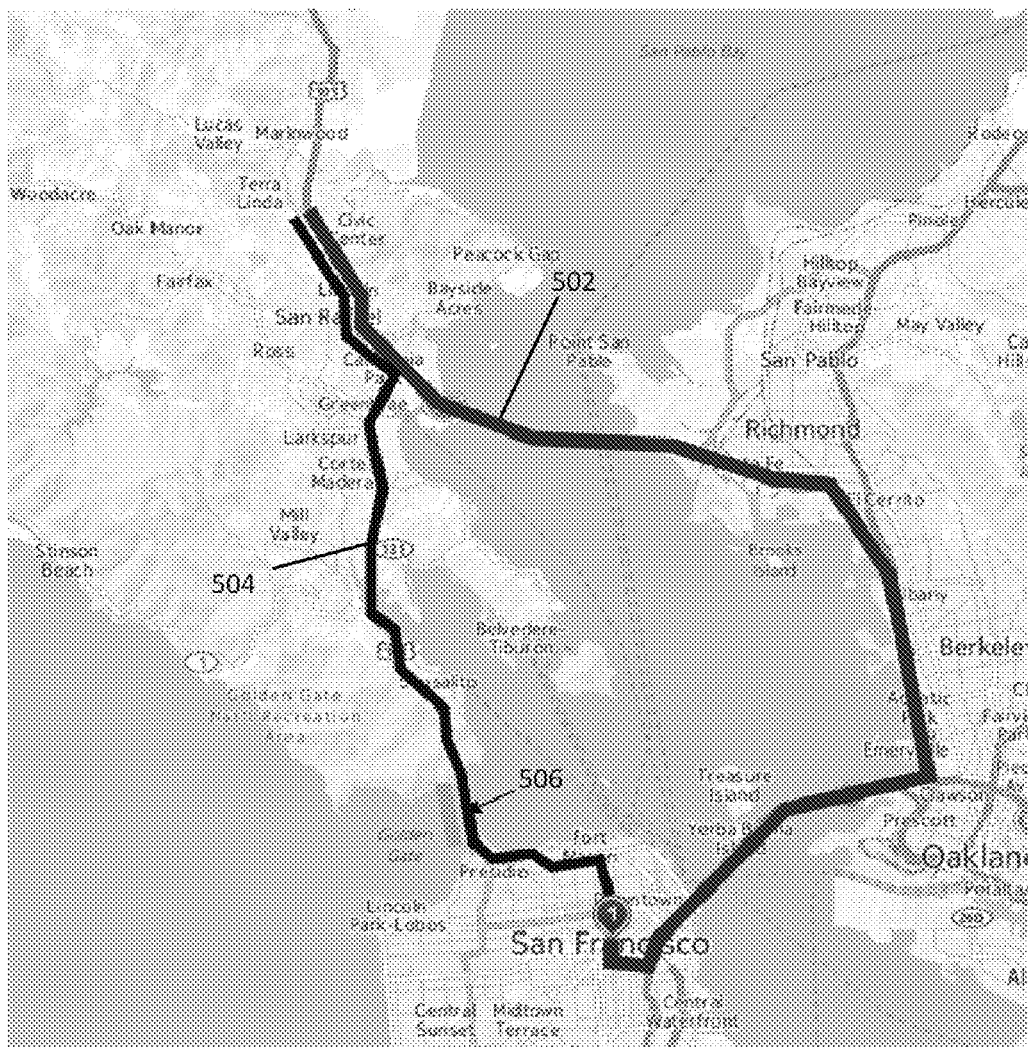
FIG. 5 illustrates an example set of routes generated by a system for fresh hybrid routing independent of map version and provider.

FIG. 5 is an example of two routes generated by the method of FIG. 4. The example 500 shows one route 502, another route 504, and a segment 506. For example, a user of a mobile device may be planning a route from San Francisco towards San Rafael. The map on the mobile device 104 may not include the segment 506, which may correspond to the Golden Gate Bridge. This may be because the map on the mobile device 104 is a version that predates the construction of the bridge. As a result, the mobile device 104 may generate a route such as route 502 which is longer than the route 504. If the mobile device 104 uses the method of FIG. 4, the mobile device 104 compares the local map and the set of routing data which includes segment 506. The mobile device 104 may request update data for segment 506. As a result, the mobile device is able to construct route 504. In some embodiments, the mobile device may only generate a route 504 for using the set of routing data and local map and is unable to generate a navigation action such as a driving action, or driving assist, or some combination thereof.

FIGS. 6a and 6b illustrate example server arrangements for providing fresh hybrid routing independent of map version and provider. Fresh hybrid routing independent of map version and provider refers to constructing a route for a start destination and end destination using a combination of locally stored data, data stored on a server, data stored online, data stored offline, regardless of the version of the data or provider of the data, or some combination thereof. FIG. 6a is an example arrangement 600, in which each server houses a particular version of a map and each mobile device houses a particular version of a map. In the event that a mobile device 608, 610, 612, requires updates to its local map, the mobile device connects to the server 602, 604, and 606 which houses the version of the map that the mobile device requires. Each server may hold a different version of the map. FIG. 6b is an example arrangement 614, where one server 616 houses multiple versions of a map and each mobile device houses a particular version of a map. In the event that a mobile device 618, 620, 622, requires updates to its local map the mobile device would connect to the server 616 and request an update. This reduces the amount of resources required to maintain updates for mobile devices with different versions of map data.

Figure 7:
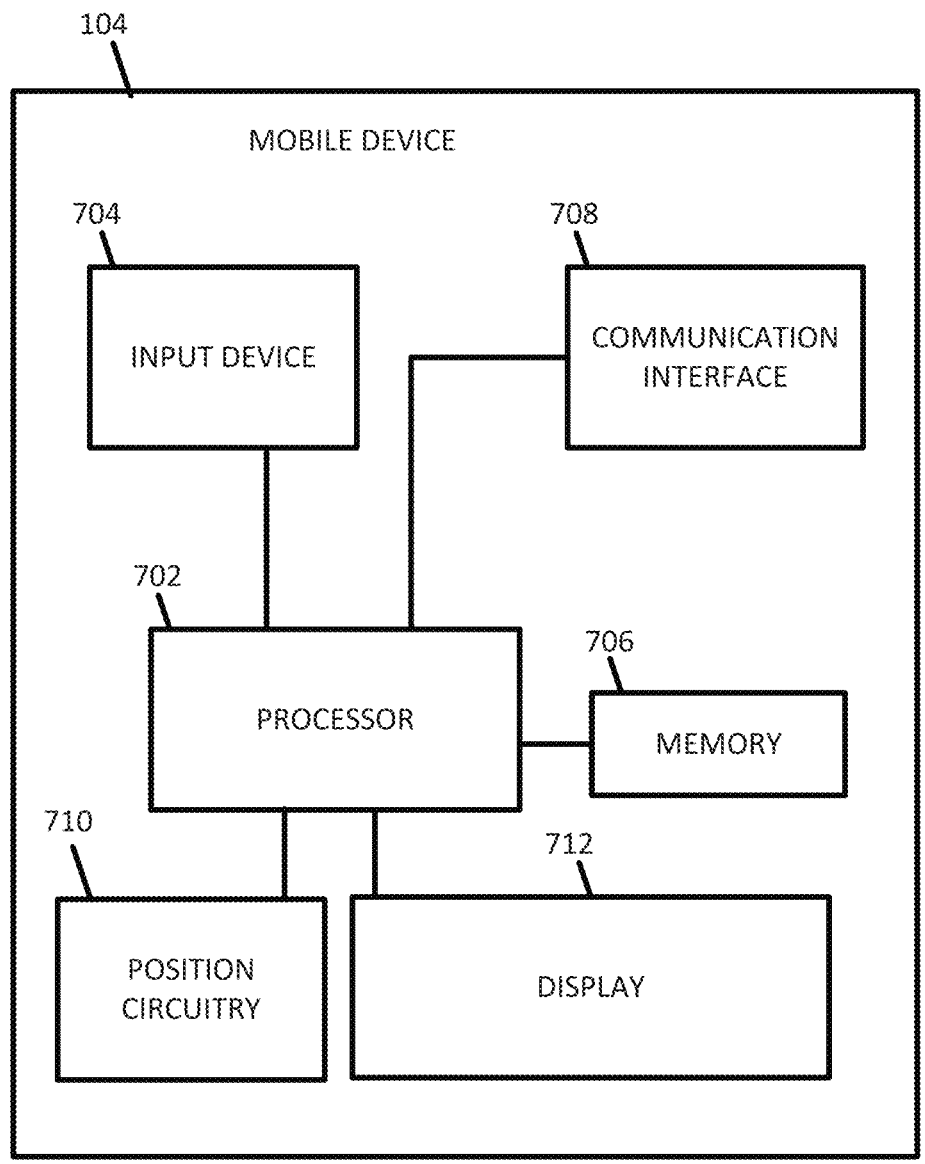
FIG. 7 illustrates an example mobile device for providing fresh hybrid routing independent of map version and provider.

FIG. 7 shows an example mobile device 104 that may be used as a navigation device. FIG. 7 includes a processor 702, a memory 704, an input device 706, a communication interface 708, a position circuitry 710, and a display 712. Additional, different, or fewer components are possible for the mobile device 104. The mobile device 104 may be a personal device such as a mobile phone equipped with position circuitry (e.g., global positioning system (GPS)) and an inertial measurement unit (IMU). The position circuitry 710 generates data indicative of the location of the mobile device 404 ("position data"). In addition or in the alternative to GPS, the position circuitry may include a dead reckoning-type system, cellular location, or combinations of these or other systems. The positioning circuitry may include suitable sensing devices that measure the traveling distance, speed, direction, and so on, of the mobile device 104. The positioning system may also include a receiver and correlation chip to obtain a GPS signal.

Figure 8:
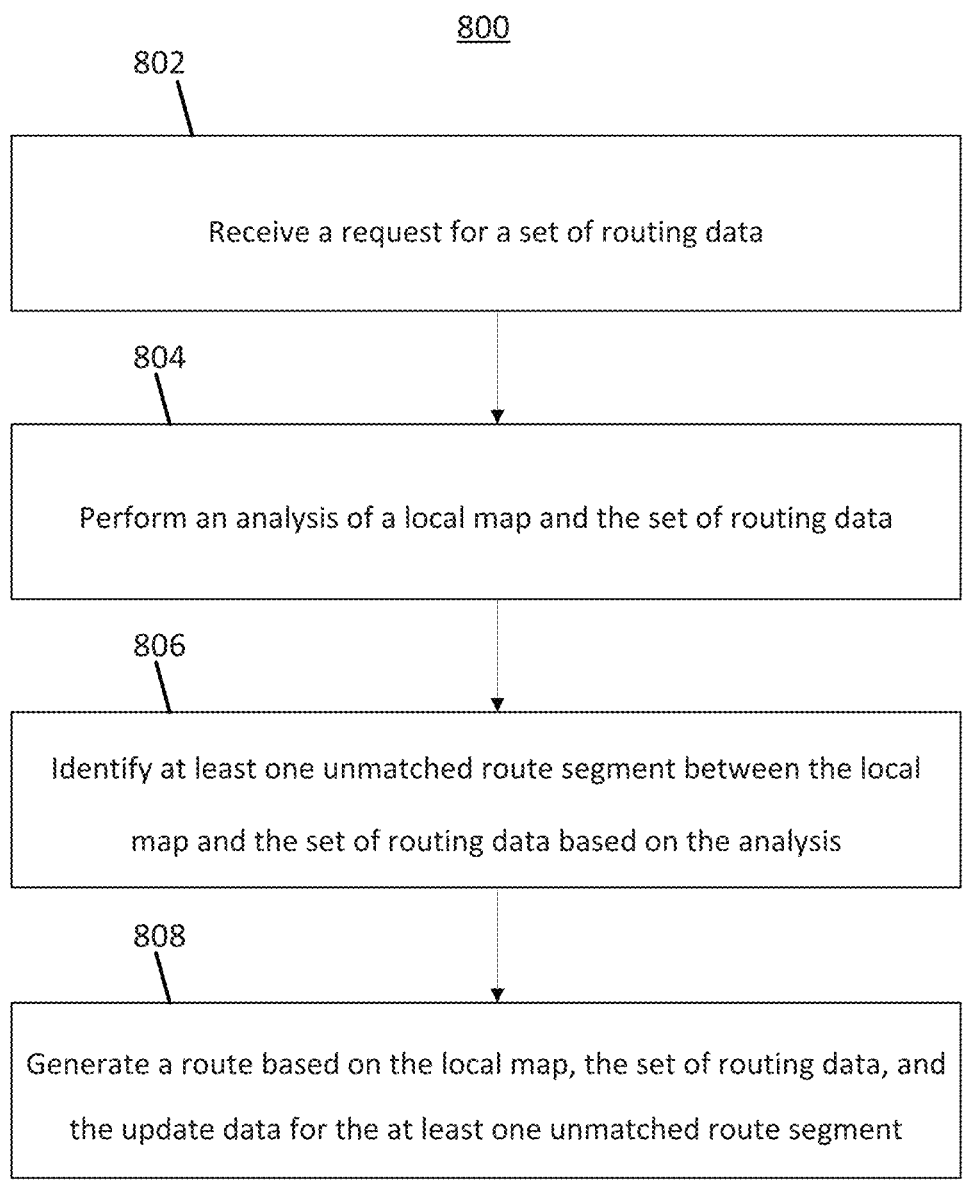
FIG. 8 illustrates an example flowchart for providing fresh hybrid routing independent of map version and provider.

FIG. 8 illustrates an example flowchart for providing fresh hybrid routing independent of map version and provider. The acts may be applied in a different order. Acts may be omitted or repeated. Additional acts may be added. At act 802, the processor 702 or the communication interface 708 may be configured to receive a set of routing data. The route request may be input by the position circuitry 710, the input device 706, a GPS, or other input device integrated with the mobile device 104. At act 804, the processor 702 may perform an analysis of a local map stored on the mobile device and the set of routing data.

At act 806, the processor 702 identifies at least one unmatched route segment between the local map and the set of routing data based on the analysis. The processor may perform this step in conjunction with the memory 704. In some embodiments the processor creates two sets of lists for matched and unmatched road segments. At act 808, the processor 702 generates a route based on the local map, the set of routing data, and the update data for the at least one unmatched route segment. In other embodiments the processor may generate a navigation command, such as a driving assistance command, or driving action.

Figure 9:
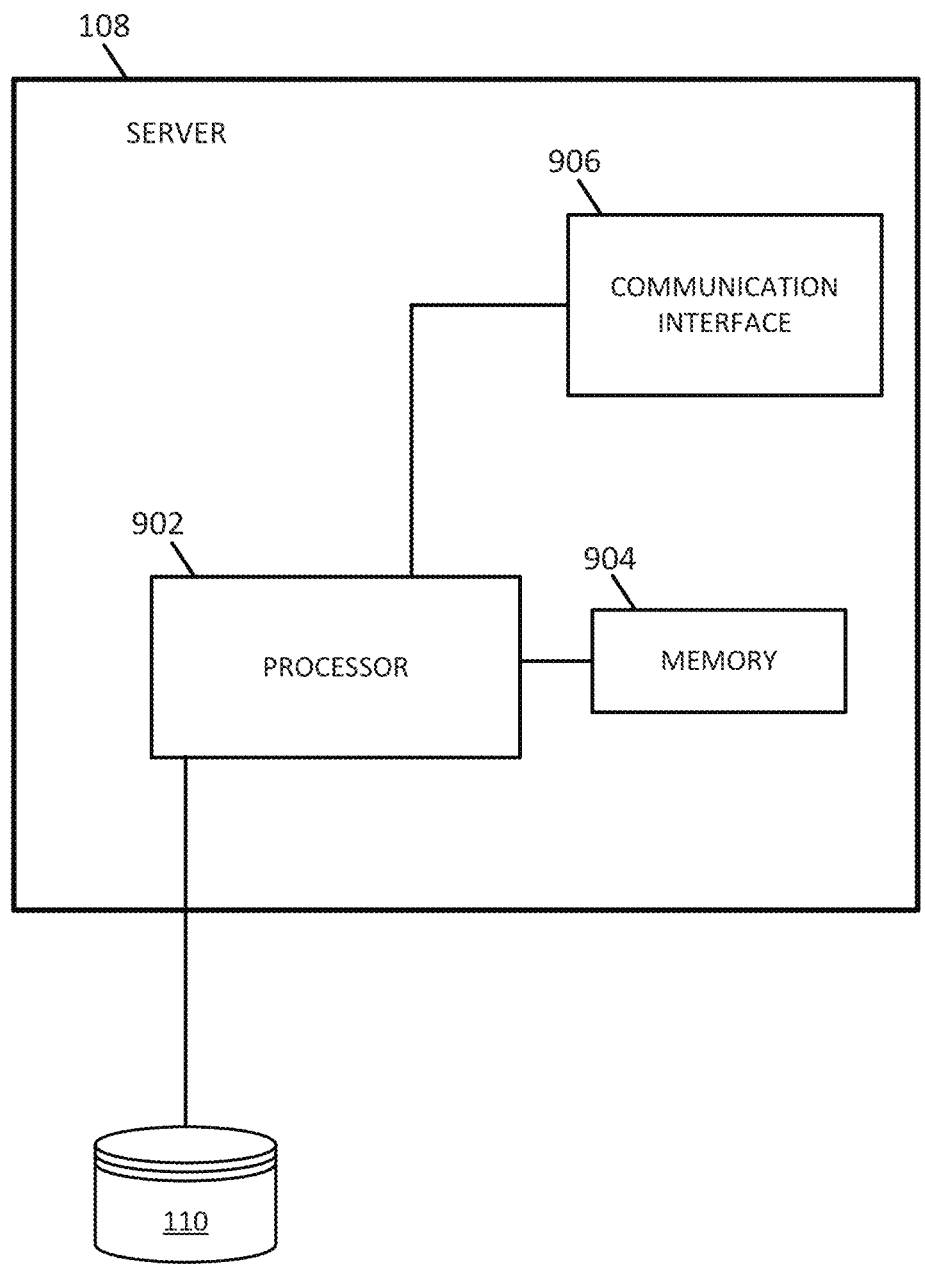
FIG. 9 illustrates an example system for providing fresh hybrid routing independent of map version and provider.
Figure 10:
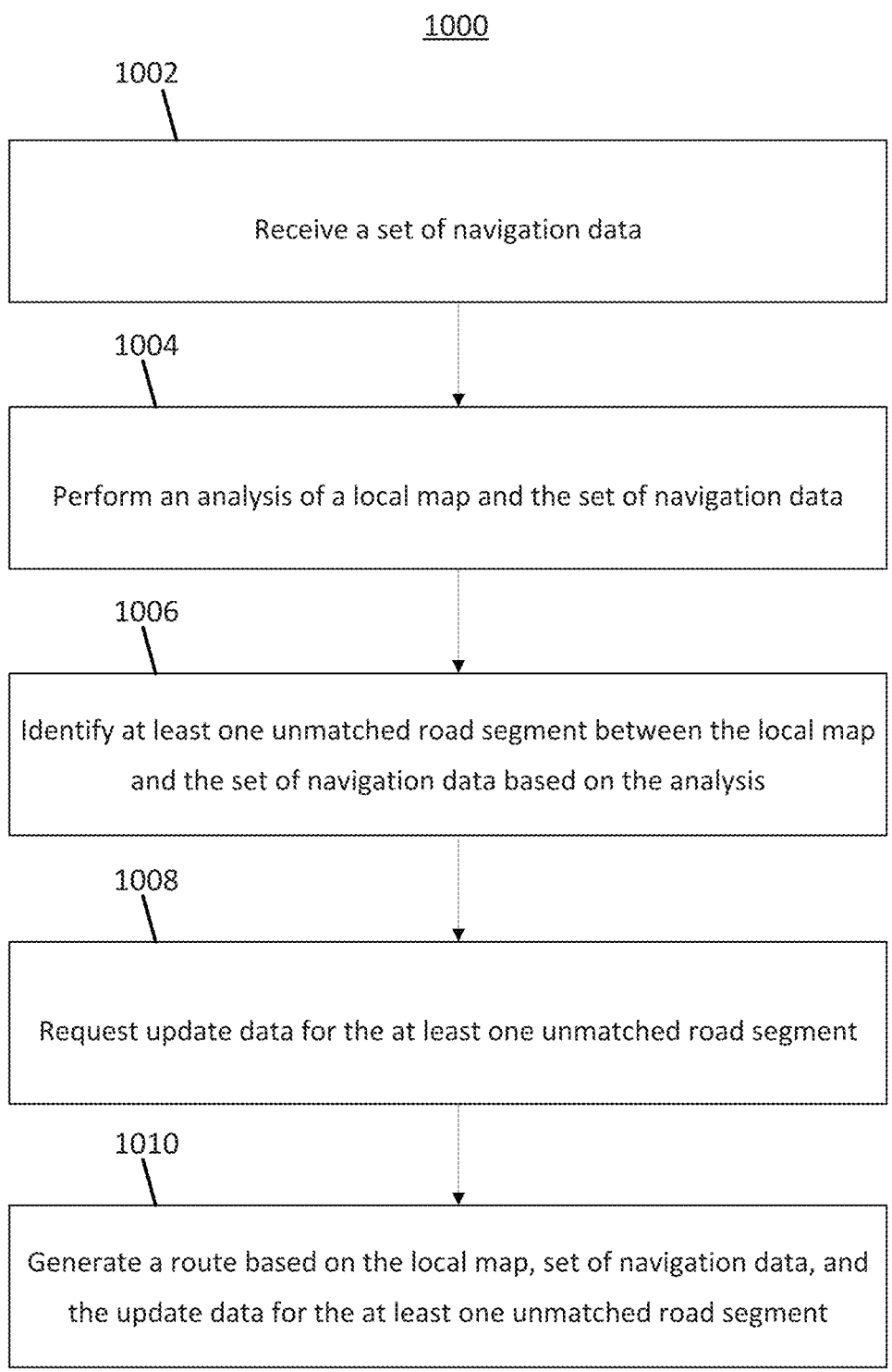
FIG. 10 illustrates an example flowchart for providing fresh hybrid routing independent of map version and provider.

FIG. 9 shows an example server 108 and processor 902 that may be used for providing fresh hybrid routing independent of map version and provider according to any of the examples above. The example server in FIG. 9 includes a processor 902, a memory 904, and a communication interface 906. The routing may be sent from the server 108 to the mobile device 104 upon request, in response to a request for routing, periodically according to a time schedule, or when the navigation application is initiated. FIG. 10 illustrates an example flowchart for providing fresh hybrid routing independent of map version and provider. The acts of the flowchart of FIG. 10 may alternatively be performed by the server 108, or a group of servers. Different, fewer, or additional acts may be included.

At act 1002, the processor 902 or communication interface 906 receives a set of navigation data through a network 106. At act 1004, the processor 902 performs an analysis of a local map and the set of navigation data. At act 1006, the processor 902 may identify at least one unmatched road segment between the local map and the set of navigation data based on the analysis. At act 1008, the processor 902 requests update data for the at least one unmatched road segment. In act 1010, processor 902 generates a route based on the local map, set of navigation data, and the update data for the at least one unmatched road segment.

In addition to the data describe above, the database 110 may include node data records, road segment or link data records, POI data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques).

The road segment data records are links or segments representing roads, streets, or paths, as can be used in the calculated route or recorded route information for determination of one or more personalized routes, according to exemplary embodiments. The node data records are end points corresponding to the respective links or segments of the road segment data records. The road link data records and the node data records represent a road network, such as used by vehicles, cars, and/or other entities. Alternatively, for example, the database 110 may contain path segment and node data records or other data that represent pedestrian paths or areas in addition to or instead of the vehicle road record data.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The database 110 may include data about the POIs and their respective locations in the POI data records. The database 110 can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the database 110 can include event data (e.g., traffic incidents, constructions, scheduled events, unscheduled events, etc.) associated with the POI data records or other records of the database 110.

Each road segment is associated with two nodes (e.g., one node represents the point at one end of the road segment and the other node represents the point at the other end of the road segment). The node at either end of a road segment may correspond to a location at which the road meets another road, i.e., an intersection, or where the road dead-ends. The road segment data record may also include data that indicate a classification, such as a rank of a road segment that may correspond to its functional class. Example functional classes include arterial roads, collector roads, and local roads. The prerecorded path may include roads outside of the functional classification system. Alternatively, an additional functional classification (e.g., private roads, temporary roads, or personalized roads) may be added to the geographic database to distinguish the prerecorded paths from other segments. Incident rates may be assigned to road segments based on functional classification.

The database 110 may be maintained by a content provider (e.g., a map developer). By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The computing device processor 702 and/or the server processor 902 may perform any of the calculations described herein. The computing device processor 702 and/or the server processor 902 may include a general processor, digital signal processor, an application specific integrated circuit (ASIC), field programmable gate array (FPGA), analog circuit, digital circuit, combinations thereof, or other now known or later developed processor. The mobile device processor 702 and/or the server processor 902 may be a single device or combinations of devices, such as associated with a network, distributed processing, or cloud computing. The computing device processor 702 and/or the server processor 902 may also be configured to cause an apparatus to at least perform at least one of methods described above.

The memory 704 and/or memory 904 may be a volatile memory or a non-volatile memory. The memory 704 and/or memory 904 may include one or more of a read only memory (ROM), random access memory (RAM), a flash memory, an electronic erasable program read only memory (EEPROM), or other type of memory. The memory 704 and/or memory 904 may be removable from the mobile device 104, such as a secure digital (SD) memory card.

The communication interface 708 and/or communication interface 906 may include any operable connection. An operable connection may be one in which signals, physical communications, and/or logical communications may be sent and/or received. An operable connection may include a physical interface, an electrical interface, and/or a data interface. The communication interface 708 and/or communication interface 906 provides for wireless and/or wired communications in any now known or later developed format.

In the above described embodiments, the network 106 may include wired networks, wireless networks, or combinations thereof. The wireless network may be a cellular telephone network, an 802.11, 802.16, 802.20, or WiMax network. Further, the network 106 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

It is intended that the foregoing description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
   receiving a set of routing data in response to a routing request, wherein the set of routing data includes road segments and the set of routing data is constructed independently of version;
   performing an analysis of a local map and the set of routing data;
   identifying a first version of at least one unmatched road segment between the local map and the set of routing data based on the analysis, wherein the first version of the at least one unmatched road segment is included in the set of routing data and a second version is included in the local map;
   requesting update data for the at least one unmatched road segment; and
   generating, by a processor, a driving assistance command based on the local map, the set of routing data, and the update data for the at least one unmatched road segments.

2. The method of claim 1, wherein identifying comprises:
   comparing the local map and the set of routing data; and
   generating a list of matched road segments and a list of unmatched road segments.

3. The method of claim 1, wherein requesting update data further comprises:
   requesting geometry and segment attributes for the at least one unmatched segment.

4. The method of claim 1, wherein the analysis produces a complete match, a partial match, or a failure.

5. The method of claim 4, wherein when the analysis produces the failure, if the update data for the at least one unmatched road segment does not exist, the navigation command is generated using the local map and the set of routing data.

6. The method of claim 1, further comprising:
   updating the local map to include the update data for the at least one unmatched road segment.

7. The method of claim 1, wherein the set of routing data includes segment attributes, geographic coordinates, and road connectivity information.

8. The method of claim 1, wherein the driving assistance command is a driving command.

9. The method of claim 8, wherein the driving command includes instructions for turning a vehicle, accelerating a vehicle, braking a vehicle, or some combination thereof.

10. The method of claim 9, where the driving assistance command includes adaptive cruise control, lane correction, or some combination thereof.

11. The method of claim 1, wherein the driving assistance command generates a route from an origin to a destination.

12. An apparatus comprising:
    at least one processor; and
    at least one memory including computer program code for one or more programs; the at least one memory and the computer program code configured to, with the at least one processor, cause the apparatus to at least perform:
    receive a set of routing data constructed independently of version;
    perform an analysis of a local map and the set of routing data;
    identify a first version of at least one unmatched road segment between the local map and the set of routing data based on the analysis, wherein the first version of the at least one unmatched road segment is included in the set of routing data and a second version is included in the local map;
    request update data for the at least one unmatched road segment; and
    generate a driving assistance command based on the local map, set of navigation data, and the update data for the at least one unmatched road segment.

13. The apparatus of claim 12, wherein identify comprises:
    compare the local map and the set of routing data; and
    generate a list of one or more matched road segments and a list of one or more unmatched road segments.

14. The apparatus of claim 12, wherein the update data further comprises geometry and segment attributes for the at least one unmatched segment.

15. The apparatus of claim 12, wherein when the analysis produces a failure, if the update data for the at least one unmatched road segment does not exist, a route is generated using the local map and the set of navigation data.

16. The apparatus of claim 12, wherein the driving assistance command is a driving command.

17. A non-transitory computer readable medium comprising instructions that when executed are operable to:
receive a set of routing data constructed independently of version;
perform an analysis of a local map and the set of routing data;
identify a first version of at least one unmatched route segment between the local map and the set of routing data based on the analysis, wherein the first version of the at least one unmatched route segment is included in the set of routing data and a second version is included in the local map; and
generate a driving command based on the local map, the set of routing data, and the update data for the at least one unmatched route segment.

18. The non-transitory computer readable medium of claim 17, wherein if the update data for the at least one unmatched road segment does not exist, a route is generated using the local map and the set of routing data.

19. The non-transitory computer readable medium of claim 17, further comprising instructions that when executed are operable to:
generate a driving action in response to the driving command, wherein the driving action may be turning a vehicle, accelerating a vehicle, braking a vehicle, adaptive cruise control, lane correction, or some combination thereof.

\* \* \* \* \*